United States Patent [19]

Hedge et al.

[11] 3,928,482

[45] Dec. 23, 1975

[54] PROCESS FOR CONVERSION OF ALKYLDECALINS AND/OR ALKYLTETRALINS

[75] Inventors: John A. Hedge, Wilmington, Del.; George Suld, Springfield; Ralph L. Urban, Newtown Square, both of Pa.

[73] Assignee: Sun Ventures, Inc., St. Davids, Pa.

[22] Filed: Apr. 8, 1974

[21] Appl. No.: 458,962

[52] U.S. Cl. ...... 260/668 F; 260/668 A; 260/672 T
[51] Int. Cl.$^2$ ..................... C07C 5/24; C07C 15/20
[58] Field of Search.......... 260/668 A, 668 F, 672 T

[56] References Cited
UNITED STATES PATENTS 3,803,253  4/1974  Suld et al........................ 260/668 A

*Primary Examiner*—C. Davis
*Attorney, Agent, or Firm*—George L. Church; Donald R. Johnson; J. Edward Hess

[57] ABSTRACT

A process for conversion of a feed consisting essentially of an alkyldecalin or an alkyltetralin (or a non-equilibrium mixture thereof) comprises contacting the feed with an alumino-silicate zeolite containing polyvalent metal cations in exchange positions, the contacting being at a temperature in the range of 100–350°C., liquid hourly space velocity in the range of 0.25 to 10 and a pressure in the range of 15 to 1500 psig.

12 Claims, 14 Drawing Figures

Fig. I

HIGH TEMPERATURE (200°C) EQUILIBRIUM
ISOMERIZATE OF C-12 DICYCLICS (RU-5008 A + B)

LOW TEMPERATURE (AMBIENT) EQUILIBRIUM
ISOMERIZATE OF C-12 DICYCLICS (RU-5020-2)

(PART I)

150" UCON CAP. COLUMN

Figure 3:
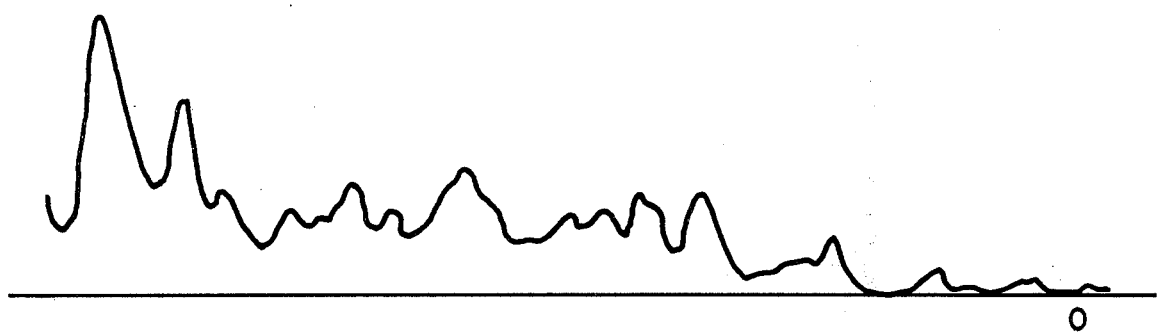

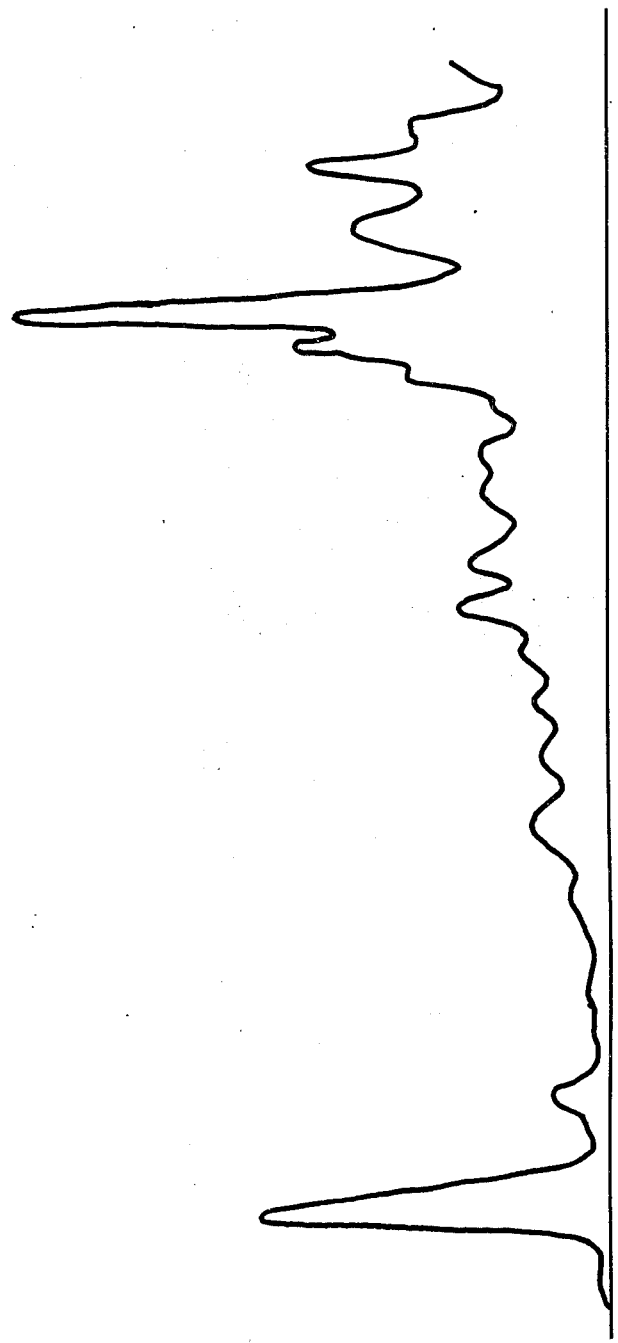
Fig. 3 (PART 2)

CATALYSATE FROM DEHYDROGENATION OF THE "NON-DEHYDROGENATABLE" FRACTION A' FROM THE DMD HIGH TEMPERATURE EQUILIBRIUM ISOMERIZATE (RU5024-2)

HIGH TEMPERATURE DMD EQUILIBRIUM ISOMERIZATE
RE-ISOMERIZED AT ROOM TEMPERATURE (RU5020-I)

(RU5020-I-H₂)

TYPICAL LOW TEMPERATURE DMD
EQUILIBRIUM ISOMERIZATE, DEHYDROGENATED (RU5020-2-$H_2$)

ISOMERIZATE FROM 2,7-DMD's OVER SK-130, 200°C

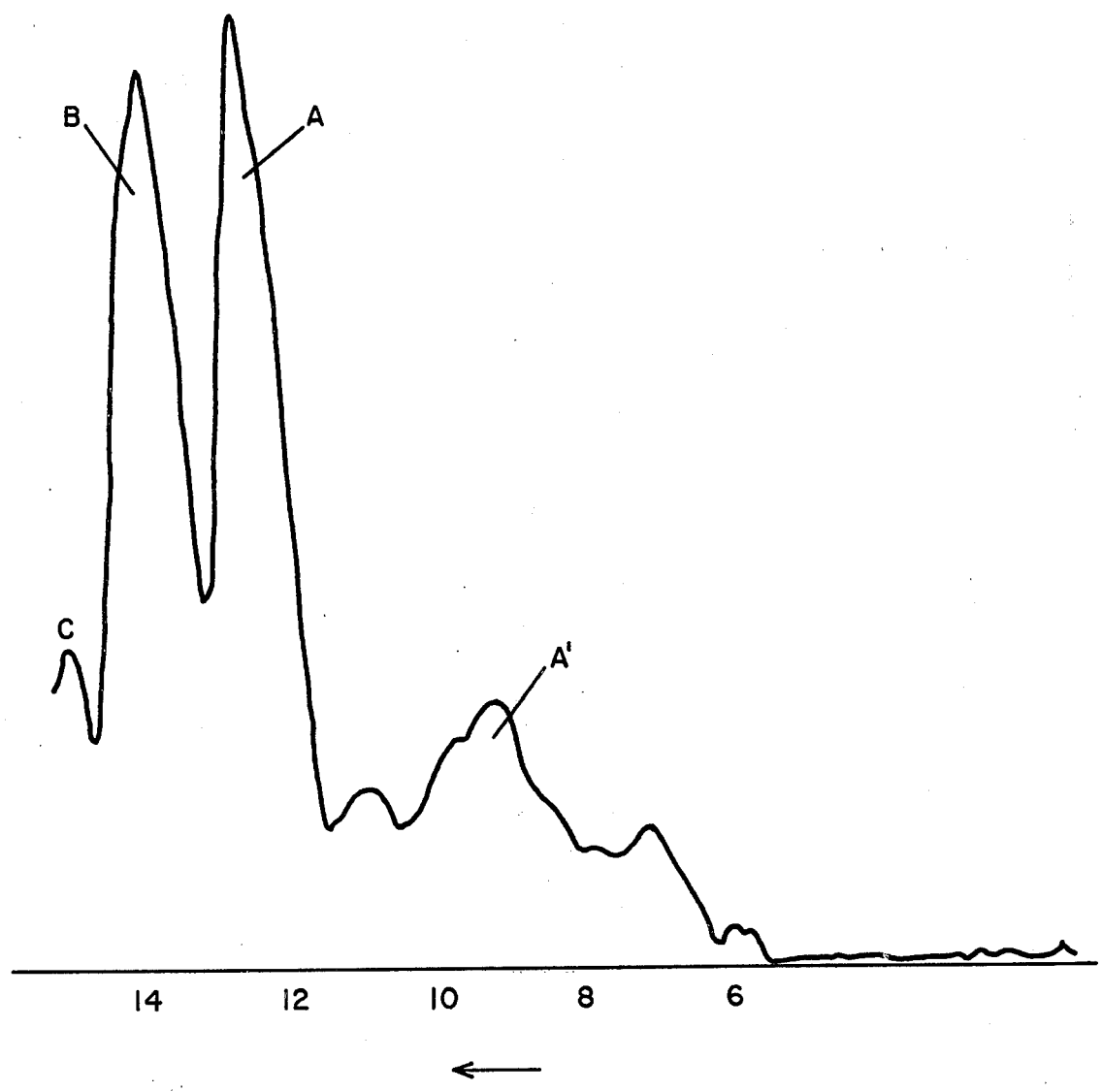

(PART 2)

CATALYSATE FROM THE SECOND RECYCLE OF MIXED DMD's OVER RD-150 (DEHYDROGENATION) CATALYST (RU5016-4)

PROCESS FOR CONVERSION OF ALKYLDECALINS AND/OR ALKYLTETRALINS

CROSS REFERENCES TO RELATED APPLICATIONS

U.S. applications Ser. No. 263,372 filed July 6, 1972 and Ser. No. 7,273 filed Jan. 30, 1970 of John A. Hedge (now U.S. Pat. No. 3,668,267 issued June 6, 1972) disclose methods for separation of 2,6-DMN from 2,7-DMN by adsorption on certain molecular sieve zeolites, which zeolites can be used as catalysts in the present process. United States application Ser. No. 99,280 of George Suld and Ralph L. Urban filed Dec. 17, 1970 (now U.S. Pat. No. 3,721,717 issued Mar. 20, 1973 describes a pulse microreactor which can be used for experimental work relative to the present invention. U.S. applications Ser. No. 211,040 filed Dec. 22, 1971 (now U.S. Pat. No. 3,839,228 issued Oct. 1, 1974) and Ser. No. 716,190 filed Mar. 26, 1968 (now U.S. Pat. No. 3,865,894 issued Feb. 11, 1975) of Kirsch, Barmby and Potts diclose methods for activation of zeolite catalysts (especially rare earth exchanged, protonated, zeolite Y) to control "water" content. Applications Ser. No. 207,870 (now U.S. Pat. No. 3,855,328 issued Dec. 17, 1974) of John A. Hedge and ser. No. 208,001 (now U.S. Pat. No. 3,803,253 issued Apr. 9, 1974) of George Suld and Ralph L. Urban both filed Dec. 14, 1971 describe certain catalysts and processes for isomerization, disproportionation and hydroisomerization of dimethylnaphthalenes and dimethyldecalins.

The entire disclosure of all of the above-cited patents and copending applications is hereby incorporated herein by this reference.

BACKGROUND OF THE INVENTION

Isomerization of mixed dimethyldecalins (DMD's) using HF—BF$_3$,AlCl$_3$—HCl, and AlBr$_3$-HBr(1) is known (e.g., see U.S. Pat. No. 3,243,469 to Abraham Schneider issued Mar. 29, 1966). Trans-trans-2,6-DMD is the highest melting isomer and can be crystallized from the isomerized mixture. The remaining liquid isomers are recycled to the isomerization. Thus dimethylnaphthalene isomers can be converted to the commercially desired 2,6-DMN via this DMD isomerization route.

SUMMARY OF THE INVENTION

Alumino-silicate zeolites (preferably zeolites containing polyvalent metal cations) can be used to catalyze alkyl transfer, e.g., isomerization, transalkylation and disproportionation of alkyldecalins in the presence of 0 to 1,000 psi of hydrogen. The "water" and metal cation content of the zeolite and the reaction conditions (particularly temperature and space velocity) can be selected so as to favor one such reaction over the others and to eliminate undesired side reactions (e.g., cracking). The preferred zeolites are at least 10% crystalline by X-ray, can adsorb benzene, and have an atomic ratio Al/Si in the range of 1.0 to 0.1. The preferred zeolites have the faujasite framework structure (e.g., Linde Type Y) and contain nickel and/or rare earth cations (e.g., cerium and/or lanthanum, etc.) in exchange positions. The zeolite can also contain or be used in admixture with a noble metal hydrogenation catalyst (e.g., platinum, palladium, ruthenium, rhenium and mixtures thereof).

The zeolite catalysts and process steps described in U.S. Pat. No. 3,668,267, U.S. Pat. No. 3,803,253, Ser. No. 207,870 and Ser. No. 208,001 can also be used for isomerization of dimethyldecalins. One objective is to isomerize a dimethyldecalin mixture to increase the amount of trans, syn-2-syn-6-dimethyldecalin (TSS-2,6-DMD). This isomer can be removed by low temperature crystallization (e.g., see U.S. Pat. No. 3,541,175 to Hedge issued Nov. 17, 1970) and the remaining dimethyldecalins can then be re-equilibrated.

The preferred temperature is in the range of 100°C to 350°C, more preferred 150°C to 250°C, typically about 160°C to 200°C.

FURTHER DESCRIPTION

Isomerization rates of dimethyldecalins with RE-Y (i.e., rare earth exchanged Type Y zeolite) sieves at 190°C were slower than for dimethylnaphthalenes. Furthermore, the desired TSS-2,6-DMD isomer was found to be present in significantly lower amounts at 190°C. Only about 13% TSS-2,6-DMD constituting ca. 60% of the total 2,6-DMD isomers, is present at equilibrium at 230°C versus about 25% TSS-2,6-DMN at 29°C.

For example, 2,7-dimethyldecalin (2,7-DMD) can be isomerized at 190°C by rare earth exchanged Type Y molecular sieve (e.g., Linde SK-500). The isomerized DMD mixture upon dehydrogenation over palladium on carbon contains:

| | |
|---|---|
| 7.0% | 1 & 2 Ethylnaphthalene |
| 21.5% | 2,6-DMN |
| 21.5% | 2,7-DMN |
| 43.0% | Other DMN's |
| 7.0% | 2,3-DMN |

Note that this conversion is not possible with dimethylnaphthalenes since the 2,6-DMN and 2,7-DMN families are not interconvertible. The isomerizate is water white; thus sieve life between recycles may be considerably longer than for the 1,6-DMN to 2,6-DMN isomerization described in U.S. Pat. No. 2,803,253. Hydrogen pressure (e.g., 15 to 15,000 psi) can also be used to prolong catalyst life.

A single isomer was used in the run described above in order to facilitate analysis. However, the process can involve isomerization of the entire mixed DMD stream obtained by hydrogenation of a 495°F to 518°F heart cut from an extract of catalytic gas oil.

Other acidic zeolites can also isomerize DMDs. Decationized zeolites and metal exchanged zeolites are examples of such acidic zeolites. Water content of these sieves may be critical for desired activity, as determined by screening runs.

A wide range of temperatures are applicable. The hydrocarbon can be in liquid or vapor or mixed (e.g., trickle) phase. Rate of catalyst deactivation versus desird conversion rate will govern the optimum operating temperature and reaction time.

The above disclosed "decalin" isomerization (or hydroisomerization) can be conducted in the presence of alkyltetralins.

Tetralins can also be converted using the catalysts and conditions described herein. Isomerization, or hydroisomerization of the methyl group on the aromatic ring of three dimethyltetralin isomers yields 2,6-dimethyltetralin (2,6-DMT). This reaction is further described in Ser. No. 208,001. Acidic zeolites at 150°C to 300°C (e.g., 190°C to 250°C) can catalyze this isomerization. If hydrogen (e.g., 25 to 1,000 psi) is used, a noble metal hydrogenation catalyst can also be present to improve catalyst life and/or yields.

Approximately 30 to 33% 2,6-DMT is present in the equilibrium mixture at 28°C starting with pure, 2,7-DMT or 1,7-DMT. With mixed DMT's from a dimethylnaphthalene concentrate, other DMT isomers which are not convertible to 2,6-DMT are present, and the amount of 2,6-DMT in the isomerizate is only 25% greater than in the charge (from 13.6% in the charge up to 17.3% 2,6-DMT in the isomerizate).

ILLUSTRATIVE EXAMPLES

An isomerization study was made wherein the model compounds used were the mixtures of configuromers of 2,3- and 2,7-DMD's derived from the exhaustive hydrogenation of the corresponding DMN isomer. In both instances four vapor phase chromatography (VPC) peaks were observed under the standard VPC analysis conditions. In addition to the two position isomers a mixed DMD concentrate was employed in the major part of the investigation. As in the case of DMN's in Ser. No. 208,001, screening studies were carried out in a pulse microreactor. Due to the complexity of both the starting material and the isomerized DMD product only a gross measure of the over-all isomerization reaction could be obtained by the combined pulse-microreactor-VPC technique. However, comparison of the VPC trace of the DMD isomerizate with the starting material and a corresponding scan of the known DMD equilibrium isomerizate gave a good measure of the extent of the reaction and hence the relative activities of each catalyst screened.

To determine the quantitative distribution between the groups of position isomers the samples of the catalysates were collected as they emerged from the gas chromatography column and dehydrogenated in a microreactor over Houdry 3-J halide free catalyst.

Table I summarizes the results obtained with a mixed DMD charge in a pulse microreactor. The catalysates contained, in addition to the compounds boiling in the DMD range, varying amounts of lighter hydrocarbons. The latter consisted of a mixture of paraffins, cycloparaffins and olefins. This hydrocracking and/or cracking reaction was again due to the severity of the conditions, i.e., the minimal temperature limitation imposed by the pulse microreactor VPC analyzer technique requiring a vapor phase operation.

On the basis of the pulse microreactor study, the catalysts employed could be divided, according to their activity, into two groups:

1. Catalysts with no isomerization activity at standard conditions and cracking-hydrocracking activity at higher temperatures, e.g., SK-200, H-Zeolon.
2. Catalysts with isomerization activity such as rare earth exchanged mole sieves, e.g., SK-130, Ce-NH$_4$+/Y, La-NH$_4$+/Y, nickel and palladium exchanged sieves, e.g., Ni-NH$_4$+/Y, SK-100.

Figure 1:
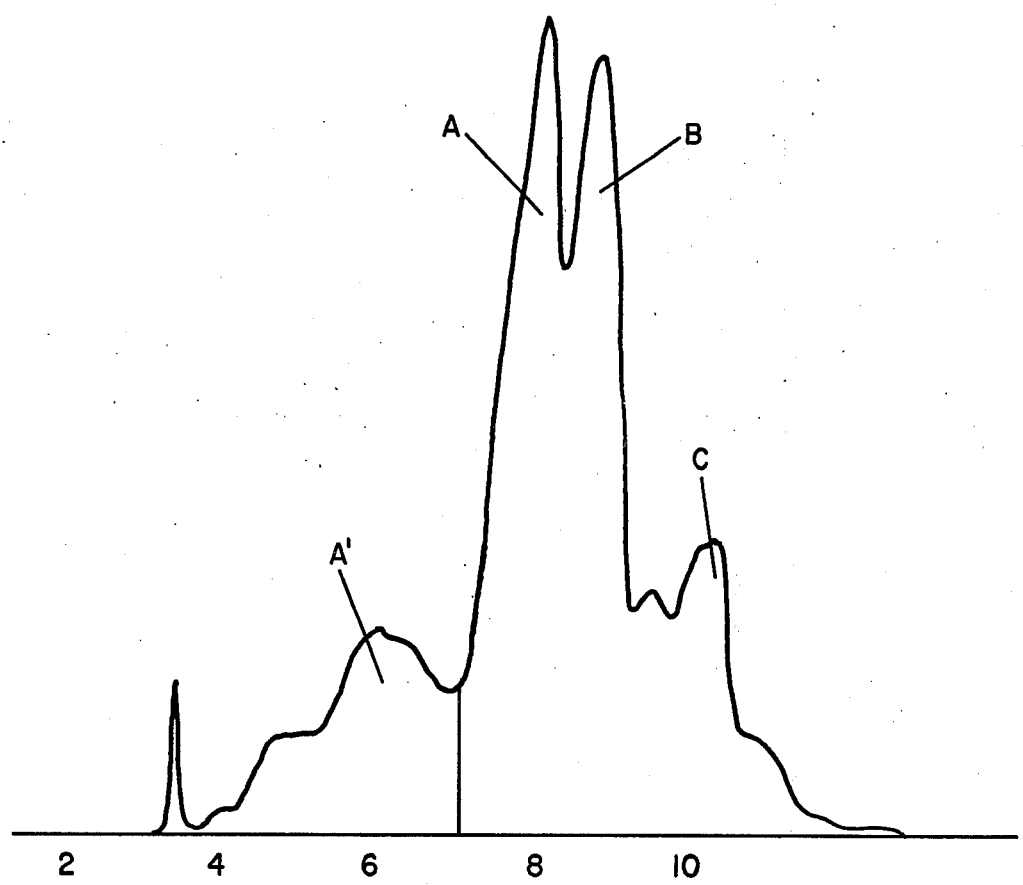
Figure 2:
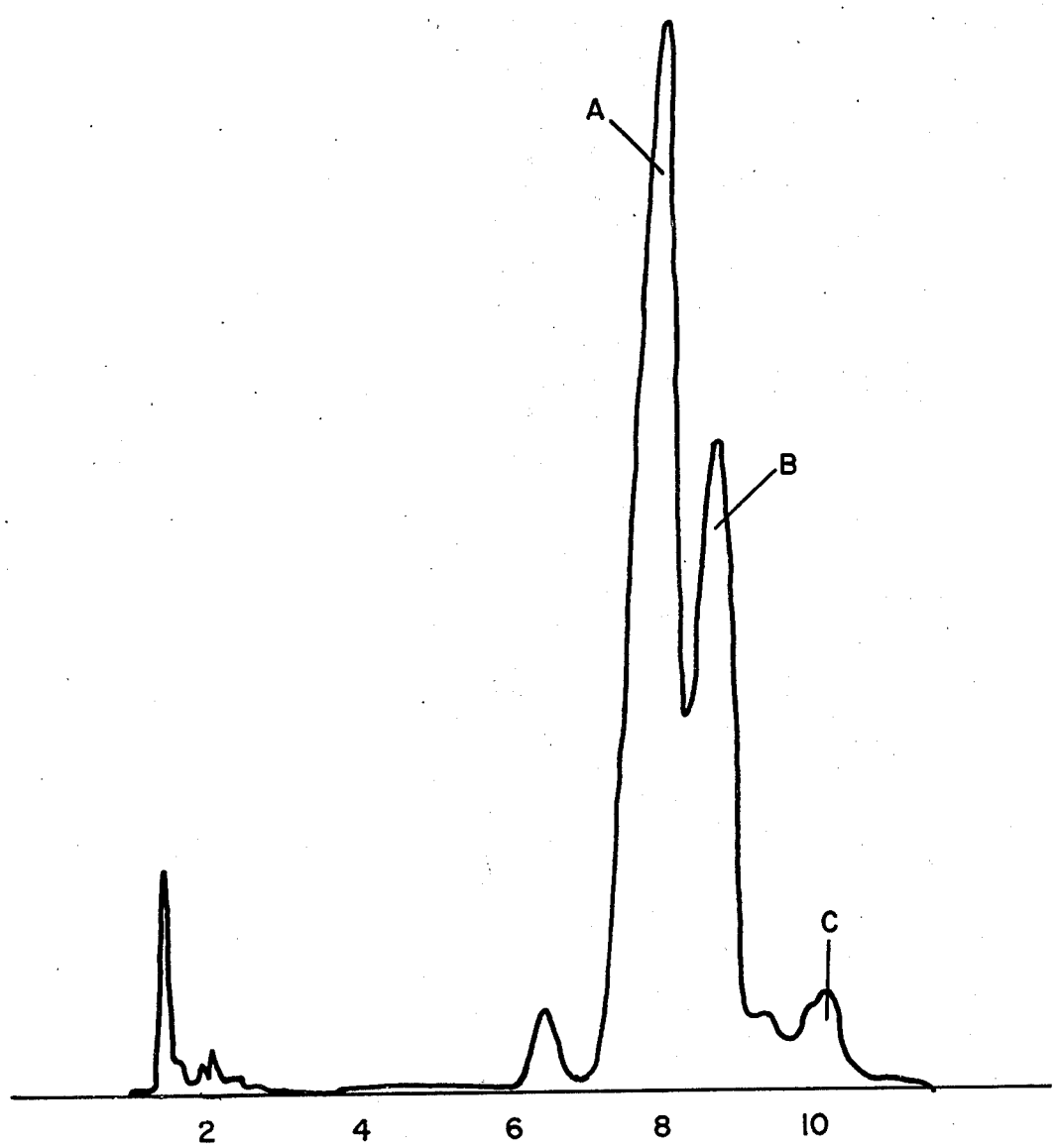

In the screening study one phenomenon was observed that had not been encountered in the isomerization of DMD's at low temperatures with Lewis acid-cocatalyst systems (e.g., AlCl$_3$—HCl or HF—BF$_3$). Thus, although the gross features of the VPC trace of the 200°C, mole sieve catalyzed DMD equilibrium isomerizate resembled low temperature (29°C) Lewis acid isomerizate, (FIG. 2), there were two major differences. One was the relative size of the peak A, which contained the desired high melting 2,6-DMD isomer and the second characteristic difference was the emergence in the high temperature isomerizate of a VPC area-envelope A' not present in the low equilibrium mixture. The relative decrease of the VPC peak A in the high temperature isomerizate could be predicted and rationalized on the basis of the temperature dependence of the equilibrium compositions of various DMD isomers ("Equilibrium Compositions at 0°–60°C of $C_{11}$ and $C_{12}$ Bicyclic Saturated Hydrocarbons," Preprints ACS Div. Petrol. Chem., Chicago, August 30-September 4, 1964, p. 112). Thus, from the computations based on the working model of non-bonded interactions the equilibrium concentration of the desired 2,6-DMD isomer (TSS) at 230°C was calculated to be 13 to 14% compared to 23% at room temperature. Since an equivalent decrease was to be expected for the corresponding STS 2,7-DMD isomer also present under peak A the experimentally observed decrease of the peak agreed well with the calculated equilibrium distribution. The identity of the numerous compounds under the broad envelope of the VPC area A' could not be determined at this time. Thus, collection of the compounds under peak area A' by the preparative scale chromatography and the subsequent analysis of the mixture by the capillary chromatography showed the presence of at least 40 different compounds (FIG. 3). The general chemical characteristic of these compounds was their refractive nature under standard dehydrogenation conditions. i.e., they were not converted to dimethylnaphthalenes.

Figure 4:
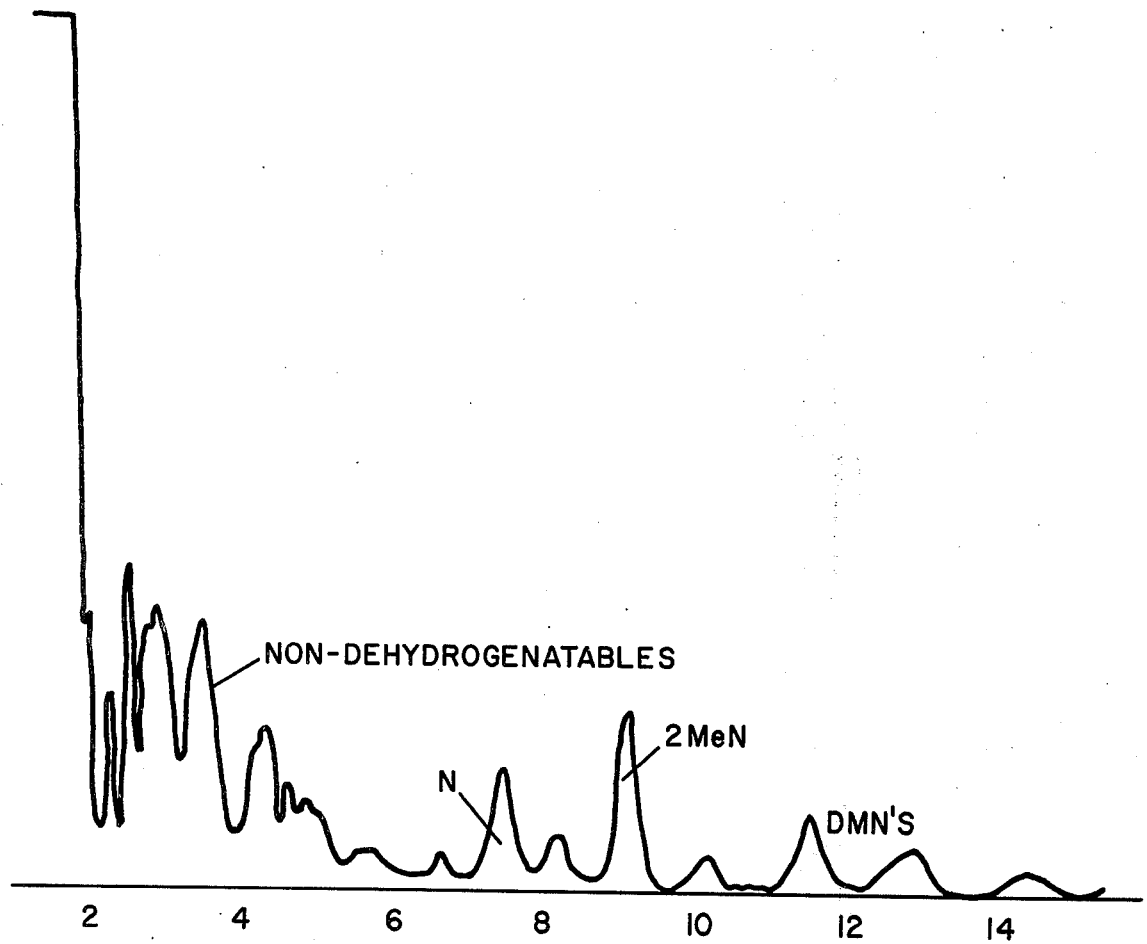

The assumption that some of these unknown compounds were either gem.-disubstituted or bridgehead substituted dimethyldecalins was corraborated indirectly by dehydrogenation under severe conditions whereby 1- and 2-methylnaphthalenes were present in the catalysate in admixture with the unchanged starting material (FIG. 4). Therefore, in addition to the dimethyldecalins with one or two quaternary carbons, other C-12 bicyclanes such as alkylbicyclononanes and alkylbicyclo-octanes are present in the mixture. In general, these bicyclanes are favored at higher temperatures and have been reported to be present in the crude petroleum fractions. Due to the complexity of the mixture of the "non-dehydrogenatables" and difficulty in the separation of the individual compounds by the standard separation techniques, have not been precisely characterized.

Figure 5:
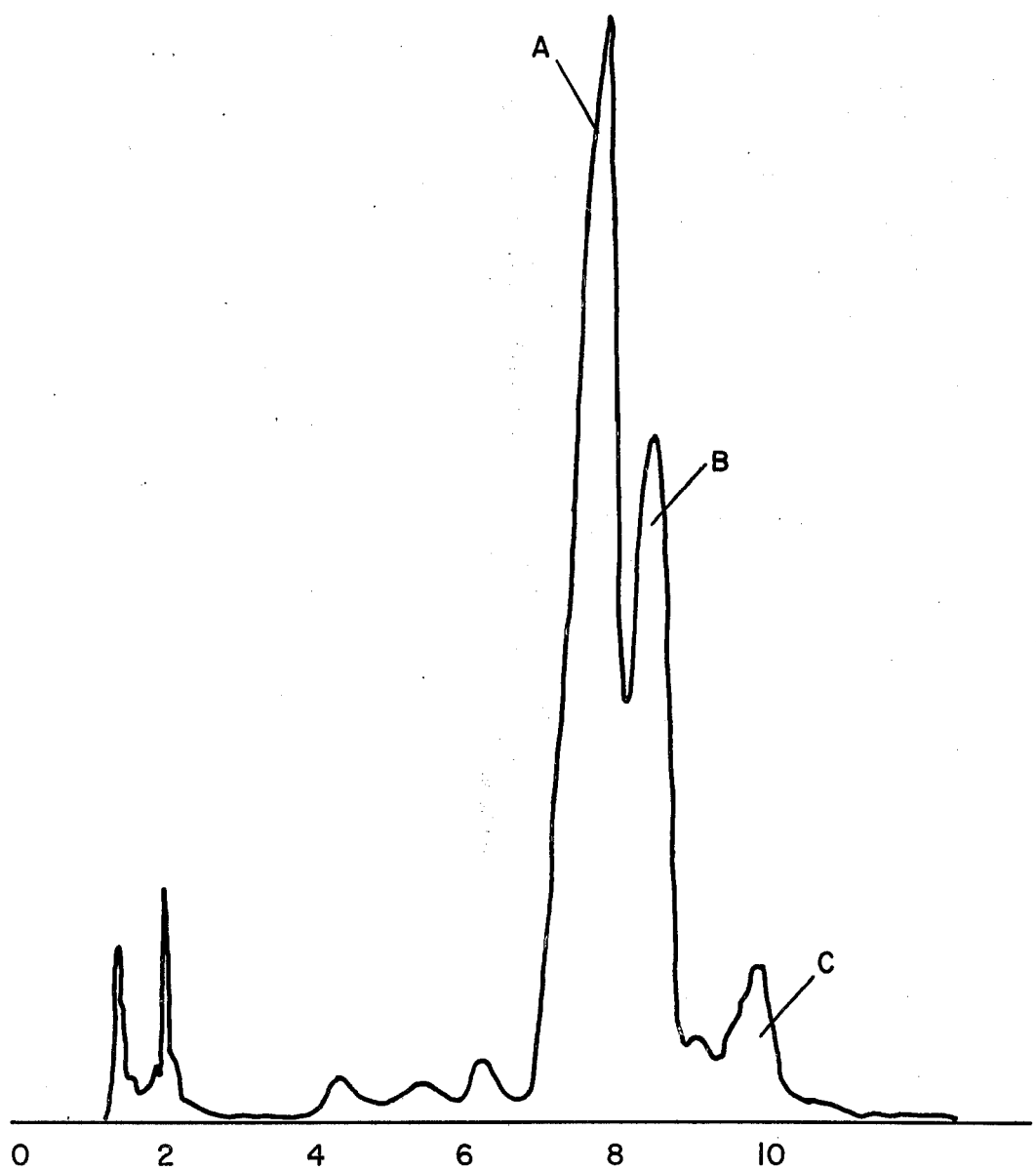

The fact that the lower boiling "non-dehydrogenatables" present in the high temperature DMD isomerizate were still C-12 dicyclics were demonstrated by the conversion of the total high temperature isomerizate to the characteristic low temperature DMD equilibrium isomerizate to the characteristic low temperature DMD equilibrium isomerizate by the AlBr$_3$-HBr-complex at room temperature (FIG. 5).

Figure 6:
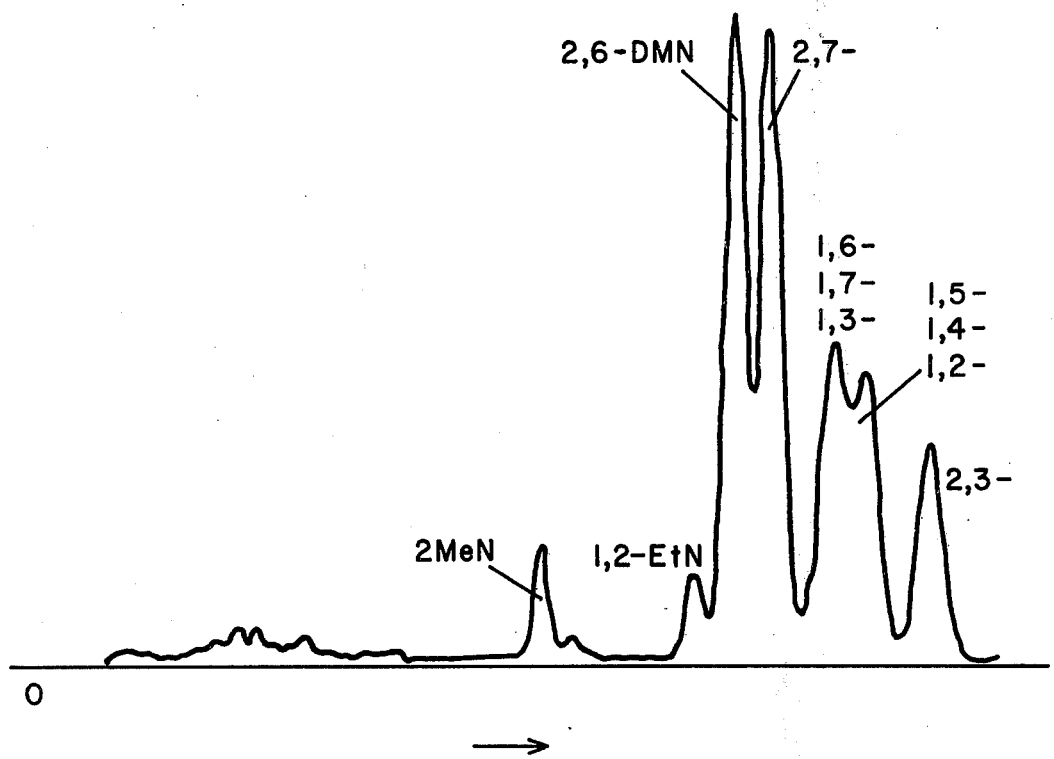
Figure 7:
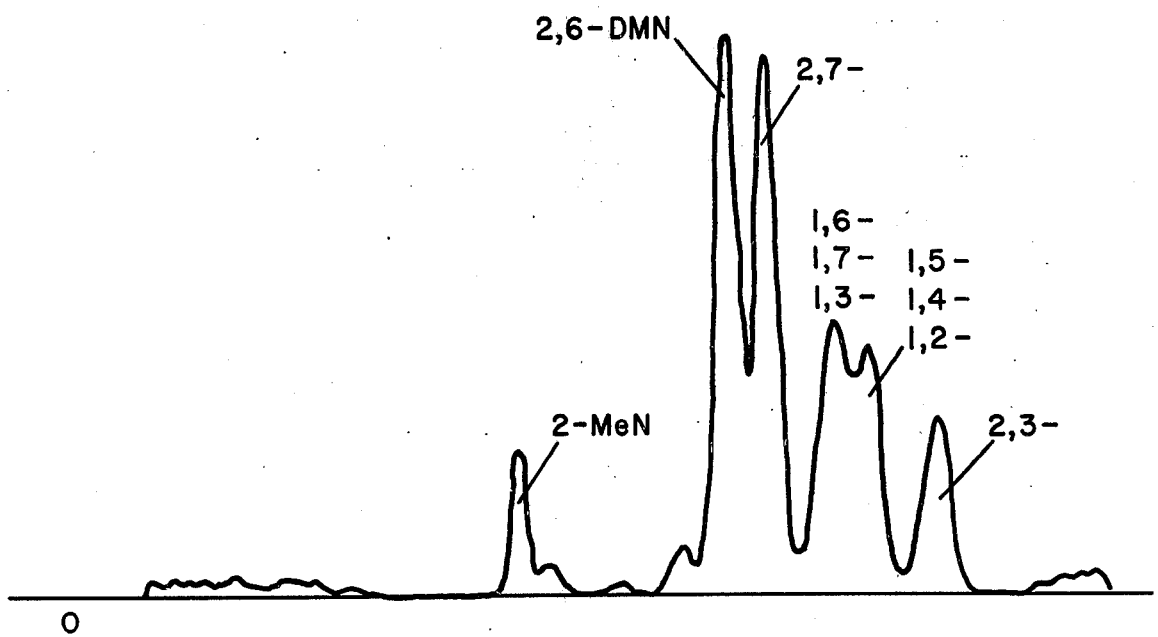

The DMD equilibrium isomerizate thus obtained afforded on dehydrogenation the typical DMN equilibrium mixture (FIGS. 6 and 7).

In addition to the general catalyst screening by the pulse microreactor technique batch and recirculating reactor runs with certain selected catalysts were carried out to determine the isomeric composition of the high temperature equilibrium mixture as well as the optimal reaction conditions.

Figure 8:
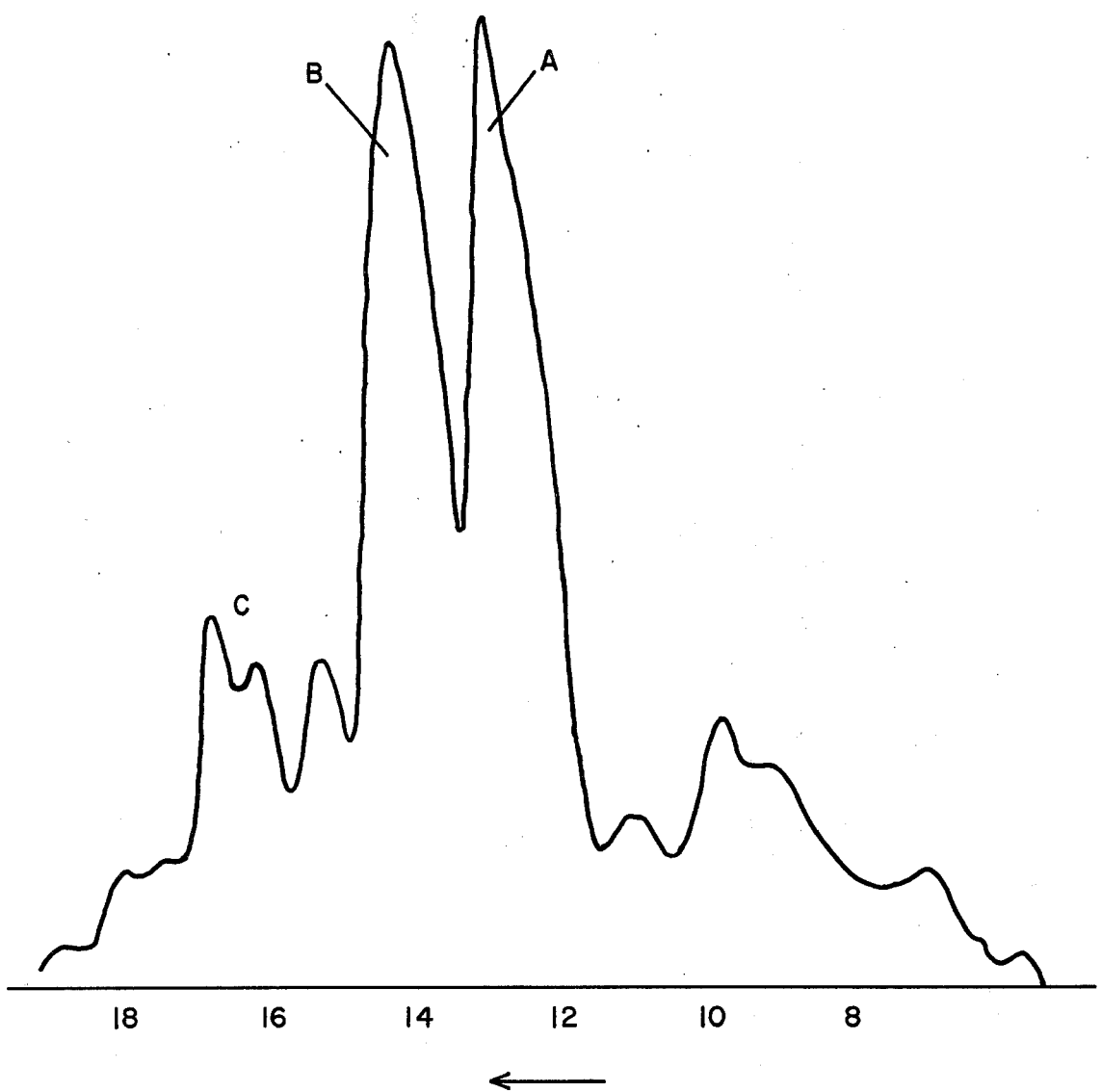
Figure 9:
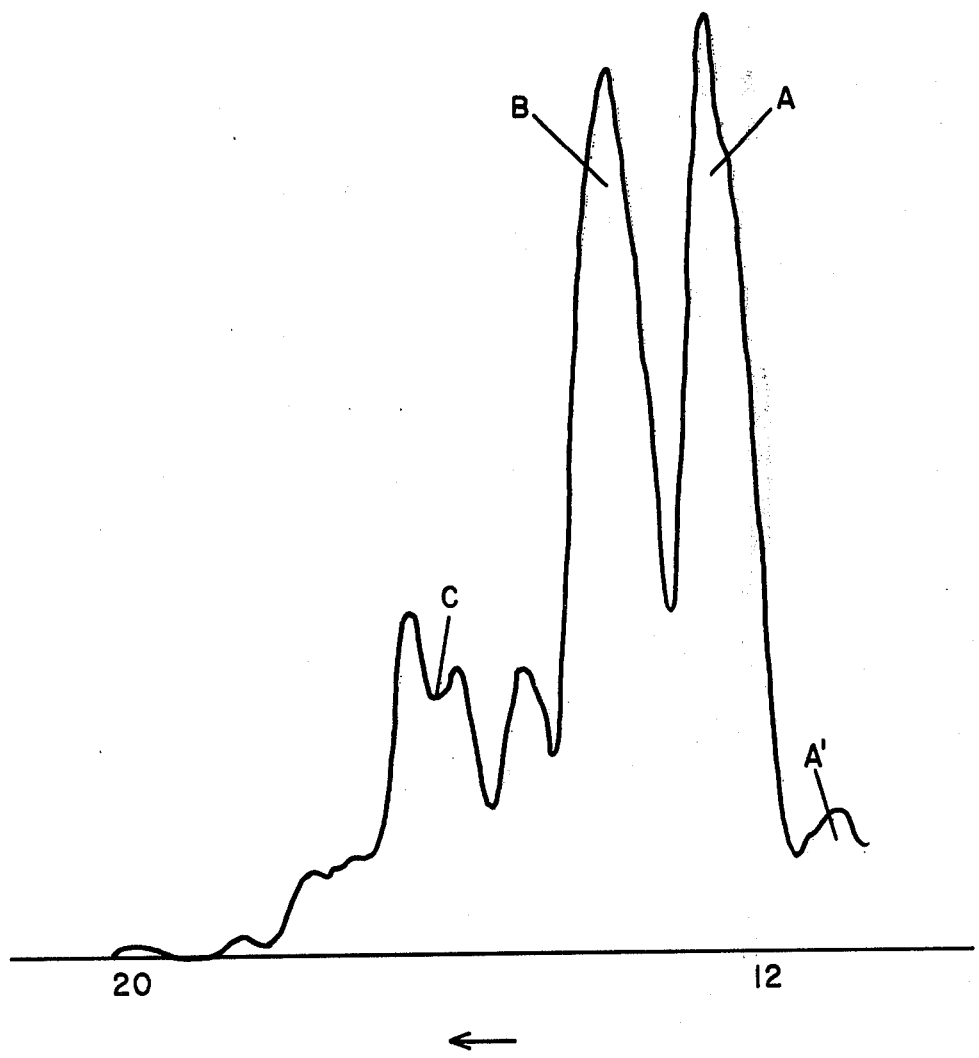

To determine the position of the thermodynamic equilibrium at an elevated reaction temperature two different charge stocks, 2,3-DMD's and 2,7-DMD's (vide supra) were isomerized independently over SK-130 catalyst until no further visual change in the VPC scans of the isomerizates was detectable (FIGS. 8 and 9).

The batch isomerization data are summarized in Table II. It is seen from the analyses of the dehydrogenated samples that essentially indentical isomerizates were obtained from the 2,3- and 2,7-DMD's after ca. 10 hours at 200°C and there was little change thereafter. Also, the formation of the other "non-dehydrogenatables" (Area A', FIGS. 8 and 9) occurred in the relatively early stage of the reaction, e.g., 18 to 20% of the final 22 to 25% of these compounds were present after ca. 4 hours. The DMN analysis of the dehydrogenates showed the total 2,6DMN content of 16% on the whole sample basis and 20 to 21% normalized for DMN's. The weight balances for the two DMD equilibrium isomerizates after 16 hours were 87% for the 2,3-DMD and 94% for the 2,7-DMD isomerizates. The material loss occurred presumably by cracking to lighter hydrocarbons which were lost in the course of the reaction as well as attendant mechanical losses.

The same catalyst, SK-130 was employed with mixed DMD's in the insomerization study in the gas phase-liquid phase recirculating reactor. The objective of this study was to determine the catalyst aging effects under continuous flow conditions and to observe, if possible, kinetic effects in the preferential formation of certain isomers.

The results with the recirculating reactor paralleled the findings with the liquid phase batch reactor. A total of 15 to 20 individual cycles with 75 to 80% overhead take-off per cycle were necessary to equilibrate mixed DMD's at LHSV of 12, i.e., cumulative reaction time of 10 hours at 250°C. The "non-dehydrogenatables" appeared early, i.e., after two to three recycles. Again, 10 to 15% of the charge was lost as the low boiling cracking products. An attempt to promote the reaction by the addition of a slow stream of hydrogen chloride to the ebullating DMD charge had no effect, i.e., no increase in the isomerization rate was observed. Also, addition of organic halide promoters such as 1,4-bis-chloromethyl cyclohexane, bis-1,2-chloroethoxyethane and bromomethyladamantane to the DMD charge resulted in little, if any, enhancement of the isomerization rate (Table III).

Finally, to determine the effect of a noble metal and hydrogen pressure on the catalyst life in the isomerization of dimethyldecalins, a 15 hour continuous flow reactor run was carried out with mixed DMD's at 235°C, 200 psig $H_2$ over a special, palladium loaded SK-130 catalyst (Pd/RE-Y).

Figure 10:
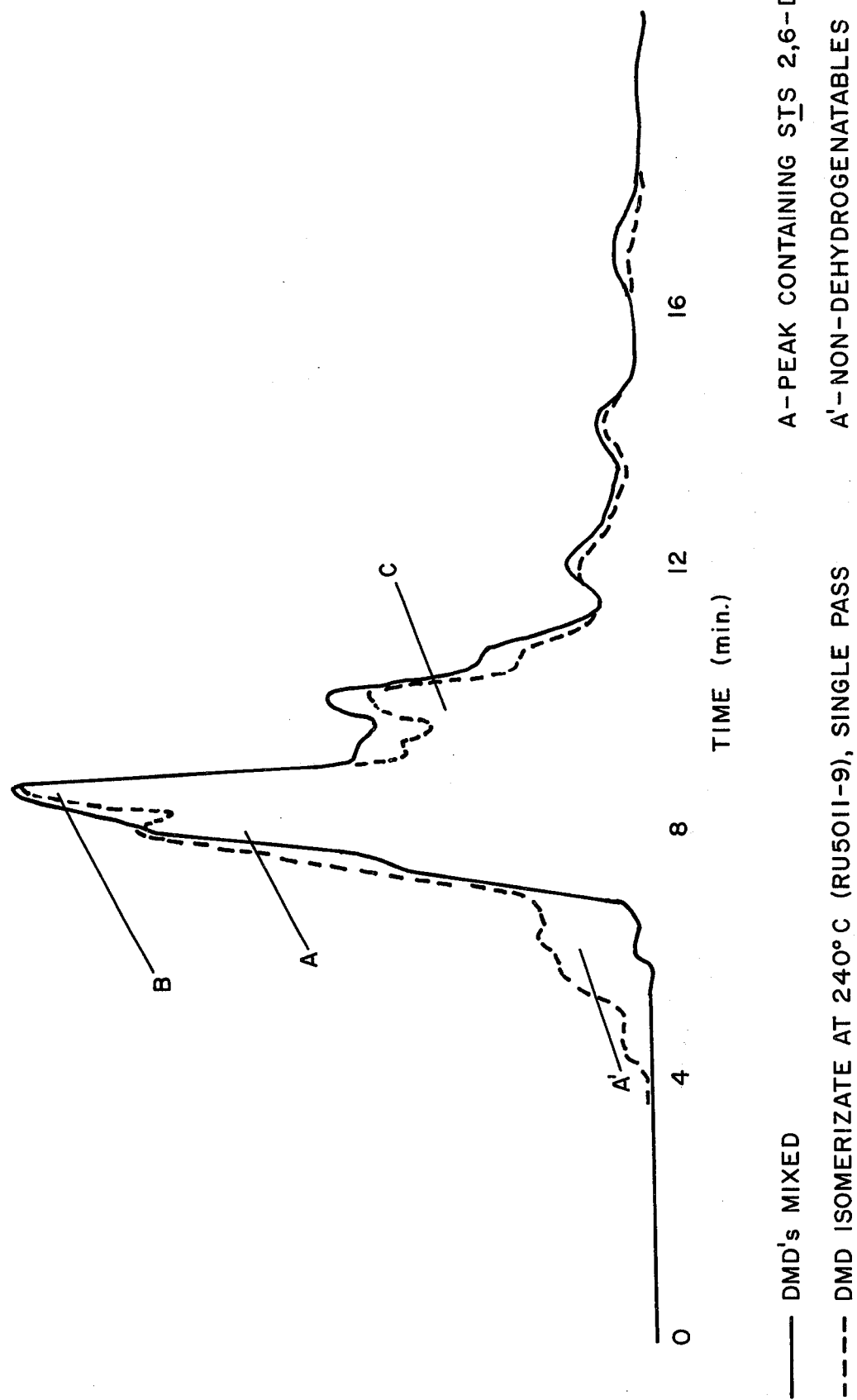
Figure 11:
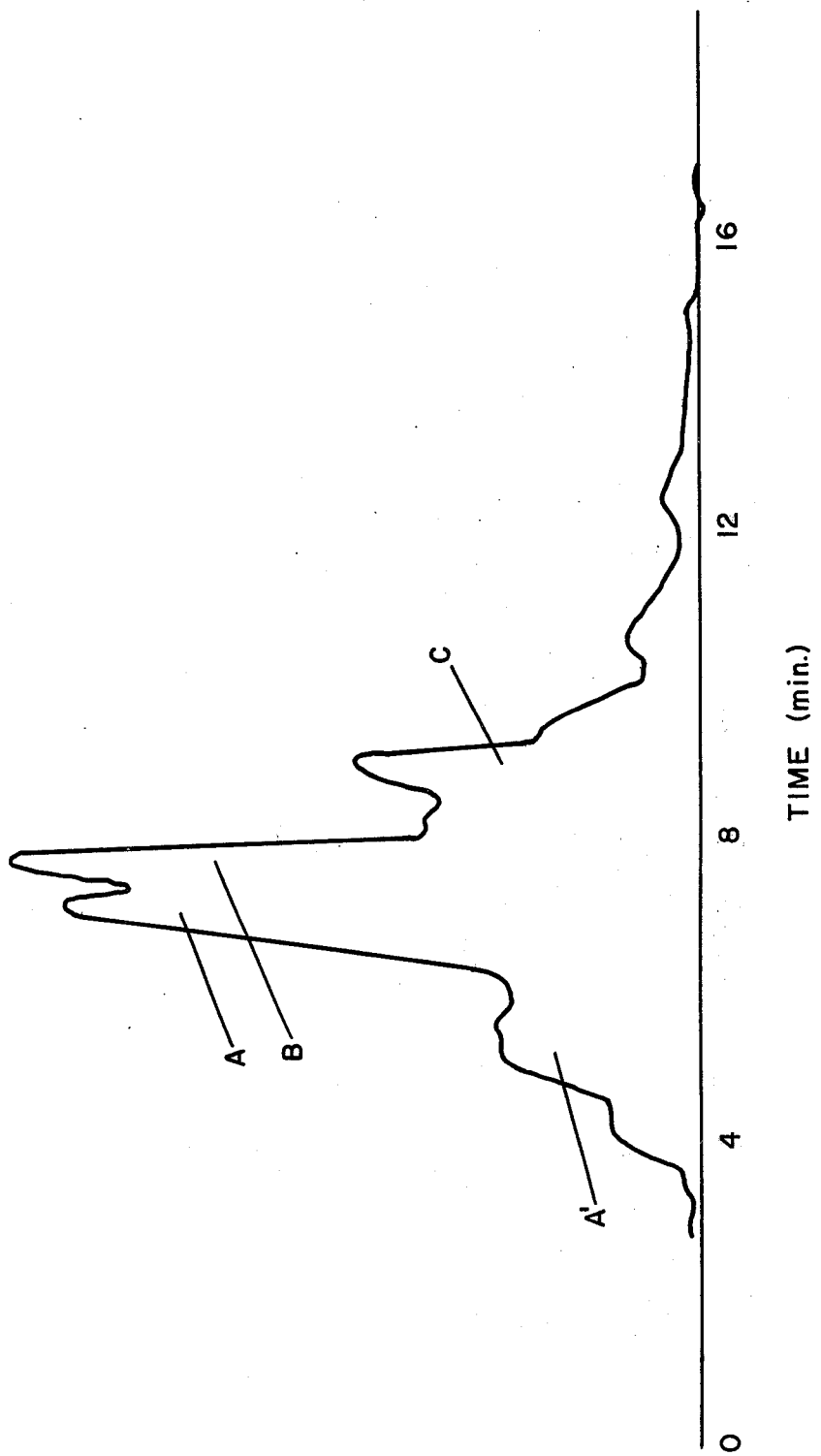
Figure 12:
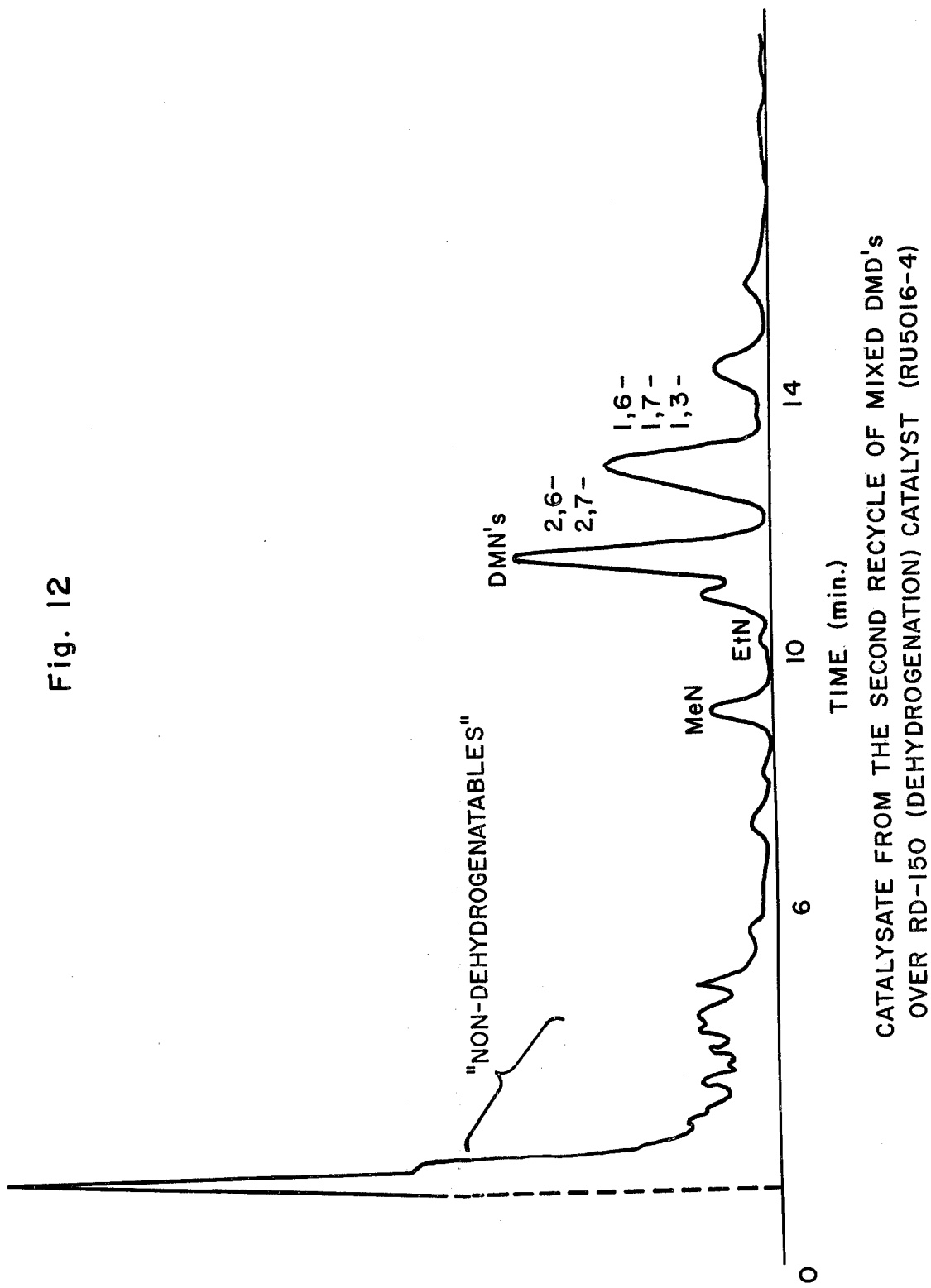

No significant decrease in the catalyst activity was observed after the above time period with cumulative 56 ml DMD-cyclohexane (1:1) feed per gram of the catalyst. Thus, the ratio of peak A to B, an index for the approach to equilibrium, was ca. 0.86 throughout the run (FIG. 10). A ratio of 0.89 was obtained after first and 0.92 after the second recycle (FIGS. 11 and 12). This shows that a near-equilibrium had been achieved in the initial single pass over the catalyst.

Trans-trans-2,6-DMD is more correctly termed trans(syn-syn-2,6)-dimethyldecahydronaphthalene or syn-2, syn-6-dimethyl trans decalin.

TABLE I

REACTION OF MIXED DIMETHYLDECALINS (M-DMD)[a]
IN A PULSE MICROREACTOR OVER MOLE SIEVE CATALYSTS

| Run No. | Catalyst (mg) | Feed | Pulse Size (ul) | Feed Cat. | T°C | p$H_2$ psig $H_2$ flow ml/min. | Result[b] |
|---|---|---|---|---|---|---|---|
| 5000-1 | SK-110 (50) | M-DMD 20% in CH | 50 | 1 | 278 | 100/100 | B, $I_E$ |
| 5000-2 | " | M-DMD 20% in $C_6H_{11}$ | " | " | " | " | B, $I_E$ |
| 5001-1 | SK-200 | M-DMD 20% in CH | " | " | " | " | NR |
| 5001-2 | " | " | " | " | 300 | 100/20 | B |
| 5002-1 | Ni-HY (50) | " | " | " | 278 | 100/100 | B, $I_E$ |
| 5002-2 | " | " | " | " | 262 | " | C, $I_E$ |
| 4987-2 | Ce-Y (117) | M-DMD | 10 | 0.085 | 276 | 100/20 | A |
| 4987-3 | " | " | " | " | " | 100 | A |
| 4987-4 | " | M-DMD 20% in CH | 50 | 0.43 | " | " | B, $I_E$ |
| 4987-6 | " | " | " | " | 305 | " | B, I |
| 4987-8 | " | " | " | 0.43 | 275 | 150/190 | B, I |
| 4998-1 | H-Zeolon (110) | " | " | 0.45 | 278 | 100/100 | C, NR |
| 4998-2 | " | " | " | " | 310 | " | B, NR |
| 4999-1 | SK-130 (110) | " | " | 0.50 | 275 | " | A, I |
| 4999-2 | " | " | " | " | 265 | " | C, $I_E$ |

[a]DMD concentrate GS332556 (MMD-27.0%, DMD-61.6%, Others-11.4%(DMD?)
[b]A - extensive (>50%) cracking or hydrocracking to lighter hydrocarbons.
B - substantial (~20–50%) cracking or hydrocracking to lighter hydrocarbons.
C - moderate (~5–20%) cracking or hydrocracking to lighter hydrocarbons.
$I_E$ - isomerization of DMD's to equilibrium or near equilibrium
I - isomerization of DMD's to an atypical product distribution
NR- no reaction
CH- cyclohexane

TABLE II

ISOMERIZATION OF 2,3- and 2,7-DIMETHYLDECALINS[b] OVER SK-130 CATALYST[a] AT 200°C. LIQUID PHASE, BATCH REACTOR

| Sample No. | Rx Time (min.)[d] | Cumulative Other A[e] | VPC Anal. (wt.%) After Dehydrogenation[f] |  |  |  |  |  |  |  |  |  |
|---|---|---|---|---|---|---|---|---|---|---|---|---|
| | | | 2-MeN | 1-MeN | Bi-Ph | 1-EtN | 2-EtN | 2,6-DMN | 2,7-DMN | 1,6-DMN | 1,7 1,3-DMN | 2,3- 1,4- 1,5-DMN | 1,2-DMN |
| 2,3-DMD[g] | 225 | 19.6 | 4.6 | 1.1 | — | — | 2.7 | | 25.5 | | 29.4 | 13.7 | 3.4 |
| 5003-1[h] | " | — | 5.7 | 1.4 | — | — | 3 | | 31.8 | | 36.6 | 17.1 | 4.1 |
| | | — | 5.5 | 1.0 | 0.4 | | 3.9 | 16.3 | 16.1 | 21.8 | 22.2 | 12.8 | |
| | 645 | 22.3 | 5.0 | 1.2 | | — | 3.8 | | 29.5 | | 27.3 | 8.3 | 2.6 |
| | | | 6.4 | 1.6 | | — | 4.9 | | 37.9 | | 35.2 | 10.7 | 3.3 |
| | | | 6.0 | 0.9 | tr. | | 5.4 | 20.2 | 19.2 | 24.0 | 16.0 | 6.6 | |
| 5003-2[g] | 985 | 24.0 | 4.2 | 1.0 | — | | 3.7 | | 30.9 | | 26.2 | 7.7 | 2.3 |
| h | | | 5.5 | 1.3 | | | 4.9 | | 40.6 | | 34.5 | 10.1 | 3.1 |
| 2,7-DMD[g] | | | | | | | | | | | | | |
| 5003-4[h] | 225 | 18.3 | 7.9 | 1.9 | | | 1.2 | | 36.6 | | 26.6 | 5.8 | 1.7 |
| i | | | 9.6 | 2.3 | | | 1.5 | | 44.8 | | 32.6 | 7.1 | 2.1 |
| | | | 8.9 | 2.1 | 0.1 | 2.0 | | 23.2 | 23.0 | 25.0 | 11.0 | 3.8 | |
| 5003-5[g] | 645 | 20.6 | 5.6 | 1.5 | | | 2.6 | | 32.5 | | 27.4 | 7.3 | 2.5 |
| h | | | 7.0 | 1.9 | | | 3.3 | | 41.0 | | 34.5 | 9.2 | 3.1 |
| i | | | 6.7 | 1.6 | 0.2 | 3.9 | | 21.5 | 21.0 | 24.5 | 14.3 | 5.9 | |
| 5003-6[g] | 985 | 21.8 | 5.4 | 1.4 | | | 2.9 | | 31.8 | | 27.0 | 7.5 | 2.2 |
| h | | | 6.9 | 1.8 | | | 3.7 | | 40.6 | | 34.5 | 9.6 | 2.9 |
| i | | | 5.8 | 1.0 | tr. | 4.7 | | 22.1 | 21.4 | 25.0 | 14.5 | 5.3 | |

[a]SK-130, milled to <20 mesh size (air exposure <2 min.), mechanical stirring, slow N₂ flow. Wt. Loss after 16.5 hrs. 13% for 2,3-DMD and 6% for 2,7-DMD.
[b]2,3- and 2,7-DMN hydrogenated over Raney Ni, 220, 300°C (6, 12 hrs.). VPC trace on a 30', 3/16" DEGS column shows 4 peaks for 2,3-DMD's and 3 peaks for 2,7-DMD's. Obtained from Dr. J. Hedge (code JH-515671, JH-515668-D3).
[c]Temp. of the oil bath.
[d]Time count only for the period at 200°C, reaction carried out over the interval of several days.
[e]Compounds with retention time less than dimethylnaphthalenes, VPC trace shows 45 peaks. A small quantity of light (<C₅) hydrocarbons also present.
[f]Dehydrogenation by the pulse microreactor technique (connected to the VPC column) over lithiated RD150 catalyst.
[g]Direct measurement of the dehydrogenate from the pulse microreactor (DEGS column, 30')
[h]Ditto normalized to DMN's
[i]DMN's only trapped in the capillary from g, analyzed by the Analytical Section on Bentone column.

TABLE III

ISOMERIZATION OF DIMETHYLDECALINS OVER SK-130, XZ-36 AND AMBERLYST 15 CATALYSTS

| Exp. No. | Catalyst(gms.) | DMD (gms.) | Sample | Time (hours) | Temp.°C | Initiator (ml) | B/A Peak Ratio |
|---|---|---|---|---|---|---|---|
| 515671 | SK-130 (25.0) | 2,3- (515671) (100.0) | 1 | 3.7 | 200 | None | 1.3 |
| | | | 2 | 5.0 | " | " | 1.1 |
| | | | 3 | 7.1 | " | " | 1.0 |
| | | | 5 | 9.5 | " | " | 0.98 |
| | | | 6 | 12.7 | " | " | 0.94 |
| | | | 7 | 12.8 | " | " | 0.93 |
| 546302 | SK-130 (10.0) | 2,3- (515671) (40.0) | 1 | 1.7 | " | 0.04 ml A | 7.9 |
| | | | 3 | 4.0 | " | " | 2.3 |
| | | | 5 | 6.0 | " | 0.4 ml A | 1.4 |
| | | | 7 | 7.0 | " | " | 1.1 |
| | | | 10 | 10 | " | " | 1.1 |
| 546303 | SK-130 (10.0) | DMD(s), mixed RU-514966 (40.0) | 1[b] | 1.7 | 154 | 0.4 ml B | —[c] |
| | | | 2 | 3.2 | 149 | " | — |
| | | | 3 | 4.2 | 153 | " | 1.5 |
| | | | 4 | 6.2 | " | " | 1.4 |
| | | | 5 | 6.5 | 150 | " | 1.4 |
| | | | 6 | 7.5 | " | 0.8 ml A | — |
| | | | 7 | 9.7 | " | " | 1.3 |
| | | | 8 | 10.7 | " | " | 1.2 |
| | | | 9 | 11.7 | " | " | 1.2 |
| | | | 10 | 12.7 | " | " | — |
| 546304 | SK-130 (5.0 gms.) | 2,3- (512966) (20.0) | 1 | 2.5 | 140 | None | N.R. |
| | | | 2 | 3.5 | " | " | " |
| | | | 3 | 5.5 | 142 | 0.2 ml A | 12 |
| | | | 4 | 8.0 | " | " | 9.0 |
| | | | 5 | 9.1 | " | " | 8.9 |
| | | | 6 | 12.0 | " | " | 8.1 |
| | | | 7 | 14.5 | " | 0.2 ml C | — |
| | | | 8 | 16.0 | " | 2.0 ml B | 5.7 |
| | | | 9 | 19.0 | " | " | 5.5 |
| | | | 10 | 20.5 | " | " | 5.2 |
| 546305A | Amberlyst 15 (5.0) | 2,3- (512966) (20.0) | 1 | 4.5 | " | None | N.R. |
| | | | 2 | 7.0 | " | " | " |
| | | | 3 | 8.0 | " | 0.8 ml B | " |
| | | | 4 | 11.7 | " | " | " |
| | | | — | 12.7 | 200 | 0.8 ml B | " |
| | | | 5 | 17.7 | " | 0.3 ml C | " |
| | | | 6 | 19.7 | " | " | " |
| 546306 | SK-130 (5.0) | 2,3- (512966) (20.0) | 1 | 1.0 | " | A[d] | 6.3 |
| | | | 2 | 3.0 | " | " | 5.6 |
| | | | 3 | 4.0 | " | " | 3.4 |
| 546306A | XZ-36 (5.0) | 2,3- (512966) (20.0) | 1 | 1.2 | 200 | None | N.R. |
| | | | 2 | 3.2 | " | " | " |
| | | | 3 | 5.2 | " | " | 14.6 |
| | | | 4 | 7.0 | " | " | 11.5 |

TABLE III-continued

ISOMERIZATION OF DIMETHYLDECALINS OVER SK-130, XZ-36 AND AMBERLYST 15 CATALYSTS

| Exp. No. | Catalyst(gms.) | DMD (gms.) | Sample | Time (hours) | Temp.°C | Initiator (ml) | B/A Peak Ratio |
|---|---|---|---|---|---|---|---|
|  |  |  | 5 | 11 | " | " | 8.0 |

[a] From relative peak heights (515671 only)
[b] Ratio B/A in the starting material = 2.05
[c] Integrator faulty here
   A - 1,4 Bis-(chloromethyl)cyclohexane
   B - 1,2 Bis-2-chloroethoxyethane
   C - 1-Bromo-3,5-dimethyladamantane
[d] Addition of 2.0 mls. in 8.0 mls. of A between the first and second hours.

The invention claimed is:

1. A process for conversion of a feed consisting essentially of an alkyldecalin or an alkyltetralin or a non-equilibrium mixture thereof, said process comprising contacting said feed under conversion conditions with an aluminosilicate zeolite containing polyvalent metal cations in exchange positions, said contacting being at a temperature in the range of 100°C to 350°C, at a liquid hourly space velocity in the range of 0.25 to 10, and at a pressure in the range of 15 to 1500 psig.

2. Process of claim 1 wherein said feed contains at least one dimethyldecalin isomer, or a mixture of dimethyldecalins and dimethyltetralins.

3. Process according to claim 2 wherein said feed consists essentially of two or more dimethyldecalins and is relatively lean with respect to 2,6-DMT and rich with respect to one or more members of the 2,7-DMT family and wherein the resulting conversion product is enriched with respect to 2,6-DMT.

4. Process of claim 1 wherein gaseous hydrogen is also present and said contacting is with said zeolite and a hydrogenation-dehydrogenation catalyst comprises at least one member selected from platinum, ruthenium, rhenium, palladium, and chemical compounds thereof.

5. Process of claim 1 wherein said zeolite is in the range of 10 to 100% crystalline by X-ray analysis.

6. Process of claim 5 wherein said crystalline portion of said zeolite has an alumino-silicate framework of the faujasite cage structure.

7. Process of claim 1 wherein said framework has an Al/Si ratio in the range of 0.35 to 0.65.

8. Process of claim 1 wherein at least 20% of the electronegativity associated with said alumino-silicate is satisfied by cations of nickel, lanthanum or a rare earth or oxides or hydroxides thereof.

9. Process of claim 8 wherein said zeolite contains less than one alkali metal cation for every four aluminum atoms in said alumino-silicate.

10. Process of claim 4 wherein said hydrogenation-dehydrogenation catalyst comprises 0.05 to 25 weight percent of platinum, palladium or a chemical compound of platinum or palladium and wherein said zeolite contains less than one alkali metal cation for every four aluminum atoms in said framework and at least 40% of the electronegativity associated with said framework is satisfied by at least one member selected from cations of at least one member selected from nickel, lanthanum, the rare earths and oxides and hydroxides thereof.

11. Process of claim 2 wherein the conversion temperature is in the range of 150° to 250°C.

12. Process of claim 1 wherein said feed contains at least one dimethyldecalin isomer or a mixture of a number of dimethyldecalin positional and stereo-isomers, or a mixture of said dimethyldecalins and a mixture of dimethyltetralins.

* * * * *